Patented Mar. 18, 1952

2,589,666

UNITED STATES PATENT OFFICE 2,589,666

AROMATIC ETHER-ESTER OF DIGLYCOLIC ACID

John D. Brandner, Wilmington, Del., assignor to Atlas Powder Company, Wilmington, Del., a corporation of Delaware No Drawing. Application April 25, 1950, Serial No. 158,089

1 Claim. (Cl. 260—484)

This invention relates to a new organic chemical compound and more particularly to a new aromatic ether-ester of diglycolic acid.

The new ether-ester of the present invention is the diester of beta phenoxy ethanol and diglycolic acid corresponding in structure and composition with the following probable formula:

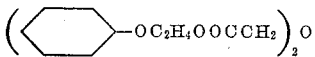

The compound may be readily prepared by the direct esterification of diglycolic acid with an excess of beta phenoxy ethanol, followed by crystallization of the diester from the excess ether-alcohol. Alternatively, the excess of beta phenoxy ethanol may be removed from the reaction mixture by distillation under reduced pressure and the diester product allowed to crystallize either from the melt or from solvent.

When made by either technique the crystalline product may be further purified by recrystallization from suitable solvents such as, for example, as benzene or toluene, methyl ethyl ketone, ethyl acetate and the like.

Other means of preparation of the compound will readily suggest themselves to those skilled in organic synthesis. One mol of diglycolyl chloride may be reacted with two mols of beta phenoxy ethanol in the presence of an inert solvent and an acid acceptor such as pyridine or the like. Alternatively, the diester of ethylene chlorhydrin and diglycolic acid may be prepared by conventional means and the resulting product condensed with two molar proportions of phenol in the presence of alkali. The method of synthesis and procedures for purification are not part of the present invention, and being conventional, need not be further elaborated at this point.

As an illustrative embodiment of a manner in which the compound of the invention may be prepared the following example is presented.

414 grams (3 mols) of beta phenoxy ethanol and 134 grams (1 mol) of diglycolic acid were heated together under partial reflux conditions, the vapor temperature being maintained at approximately 100° C. In the course of 7 hours the temperature of the reaction mixture rose from 140° to 230° C. and the acid number decreased to a value of less than 10. Pressure in the reaction vessel was then reduced to 5 to 10 mm. mercury (absolute) and the excess of beta phenoxy ethanol distilled off at a temperature of 200° C. in about 1¼ hours.

The charge in the flask was cooled to 130° C., agitated with 1% of activated carbon while cooling to 100° C., and filtered. 356 grams of product were obtained which crystallized into a solid cake on cooling to room temperature. The product had an acid number of 0.5, a saponification number of 304, and a hydroxyl number of zero.

The cake was broken up and dissolved in twice its own weight of hot toluene. Upon cooling overnight most of the reaction product had crystallized in the form of lustrous plates. The crystals were filtered, washed with toluene, air dried, and finally vacuum dried. The dried crystals melted at 80–81° C., had an acid number of 0.6 and a saponification number of 300. There was no detectible free hydroxyl therein. The saponification number coincides with the theoretical value of the diester corresponding to the formula:

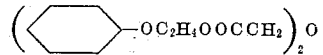

The new compound of the present invention is compatible with nitrocellulose and may be utilized as plasticizer for nitrocellulose films and plastics. It may be the sole plasticizer or may be used in conjunction with other plasticizers. The said compound exhibits a plasticizing effect on other cellulose esters and ethers but cannot be used as sole plasticizer for such derivatives because of its tendency to crystallize from films and castings thereof. In more complex systems where crystallization of the diglycollate is inhibited by the presence of other plasticizers and/or resins, the new compound may be utilized as a plasticizer in a wide variety of plastics.

What is claimed is:

As a new product the diglycolic acid diester of beta phenoxy ethanol.

JOHN D. BRANDNER.

REFERENCES CITED

The following references are of record in the file of this patent:

UNITED STATES PATENTS

| Number | Name | Date |
|---|---|---|
| 2,283,764 | Rosenbach | May 19, 1942 |
| 2,347,627 | Bruson | Apr. 25, 1944 |